ALPHA-OLEFIN INTRODUCTION TEMPERATURES

TEMPERATURE INCREMENT FROM ALPHA-OLEFIN INTRODUCTION TEMPERATURE TO PEAK TEMPERATURE

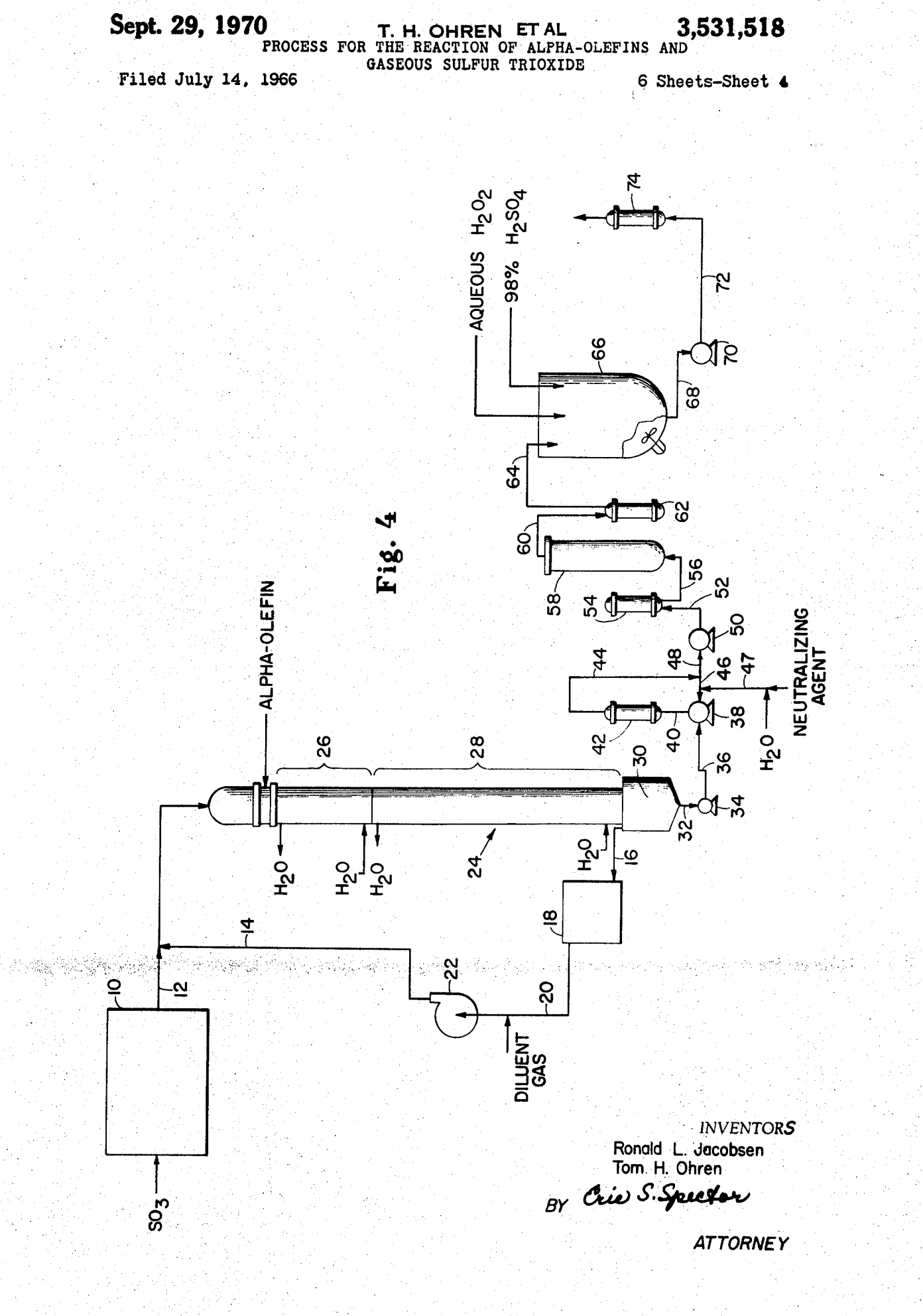

Sept. 29, 1970  T. H. OHREN ET AL  3,531,518
PROCESS FOR THE REACTION OF ALPHA-OLEFINS AND
GASEOUS SULFUR TRIOXIDE Filed July 14, 1966  6 Sheets-Sheet 4

Fig. 4

INVENTORS
Ronald L. Jacobsen
Tom H. Ohren

BY Eric S. Spector

ATTORNEY

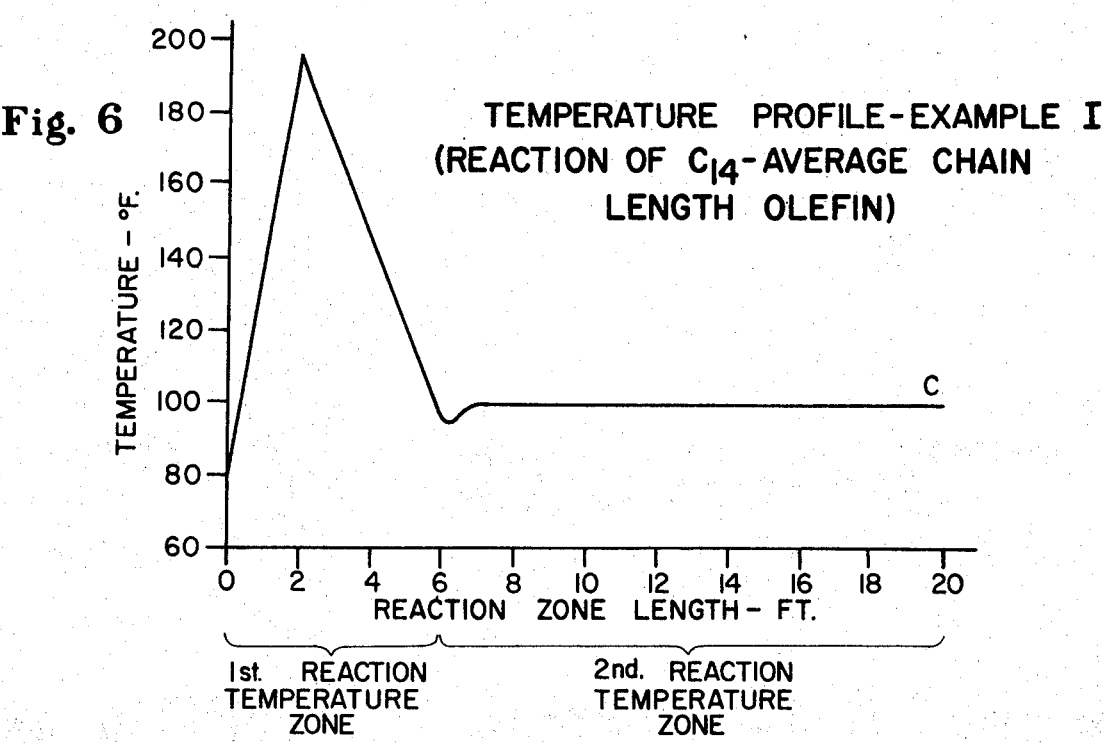
Fig. 6 TEMPERATURE PROFILE-EXAMPLE I
(REACTION OF $C_{14}$-AVERAGE CHAIN LENGTH OLEFIN)
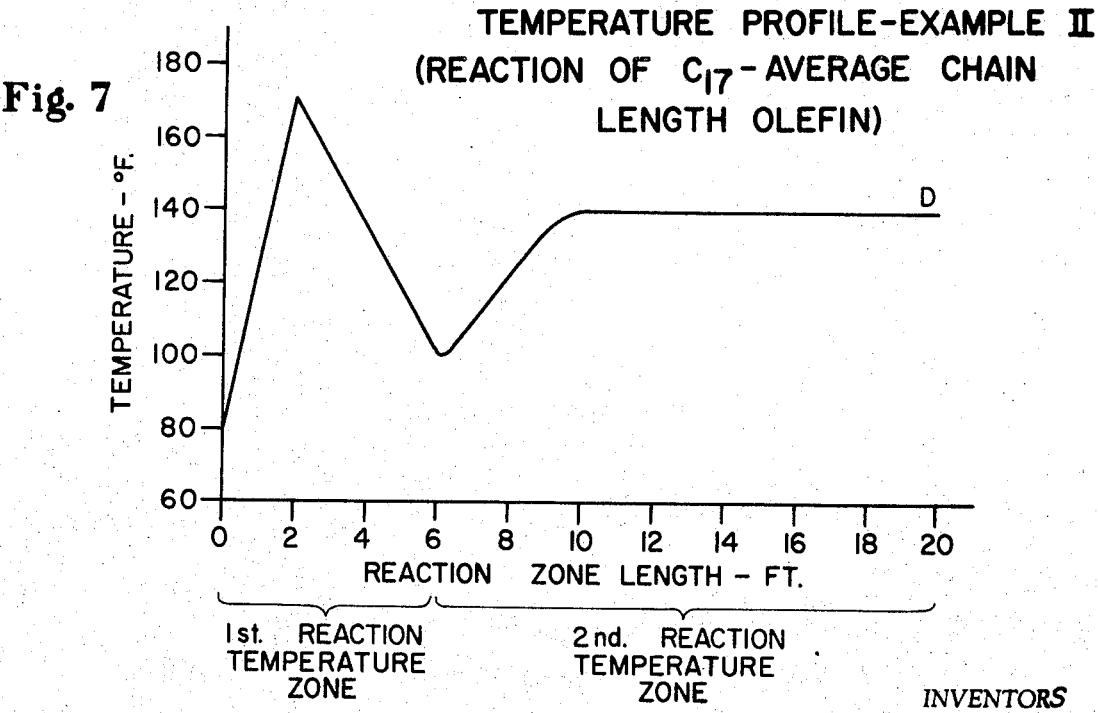
Fig. 7 TEMPERATURE PROFILE-EXAMPLE II
(REACTION OF $C_{17}$-AVERAGE CHAIN LENGTH OLEFIN)

United States Patent Office 3,531,518
Patented Sept. 29, 1970

3,531,518
PROCESS FOR THE REACTION OF ALPHA-OLEFINS AND GASEOUS SULFUR TRIOXIDE
Tom H. Ohren, Golf Manor, and Ronald L. Jacobsen, Wyoming, Ohio, assignors to The Procter & Gamble Company, Cincinnati, Ohio, a corporation of Ohio
Filed July 14, 1966, Ser. No. 565,262
Int. Cl. C07c *143/02*
U.S. Cl. 260—513         2 Claims

ABSTRACT OF THE DISCLOSURE

In the film sulfonation of fatty alpha-olefin, the increase in temperature during reaction is controlled and thereafter particular temperatures are maintained. Due to the temperature control greater than 85% reaction completeness is achieved, and detergent of commercially acceptable color is produced after a minimum amount of bleaching. For example, the temperature of reaction for $C_{14}$-alpha-olefin is controlled to a peak temperature of 197° F. and thereafter maintained at 100° F. to provide 96% reaction completeness, and the reaction mixture is converted to detergent which after mild bleaching has a Coleman Color reading of 85.

This invention relates to an improved process for the reaction of alpha-olefins and gaseous sulfur trioxide. More particularly, this invention relates to a process wherein gaseous sulfur trioxide is reacted with a thin flowing film of alpha-olefin under essential conditions of temperature and other conditions as specified hereinafter. The reaction product of this process can be further processed to produce an organic water-soluble reaction product which has valuable detergent properties and is thus useful as a detergent composition.

While reaction of alpha-olefins with gaseous sulfur trioxide has been known for several years now, there is a continuing need and demand for improved process in this area. This is because, first of all, many of the known processes do not provide reaction product which is readily processed to produce product having outstanding detergent properties. Moreover, despite the fact that alpha-olefins are relatively inexpensive, detergents derived from them have not yet been manufactured on a large scale basis. While film sulfonation processes are generally known, the present process which produces a reaction mixture which can be converted to an outstanding detergent product having commercially acceptable color is not known to have been described in the prior art.

Accordingly, it is an object of this invention to provide an improved process for the reaction of alpha-olefins and gaseous sulfur trioxide.

It is a further object of this invention to provide a process for the film reaction of alpha-olefin and gaseous sulfur trioxide to produce a reaction mixture which can be converted to an outstanding detergent product having commercially acceptable color.

It is a further object of this invention to provide an inexpensive continuous process for the reaction of alpha-olefin and gaseous sulfur trioxide, which process can be readily scaled up to factory requirements with a minimum of effort and without adverse effect on cost factors or sacrifice to uniform high quality of reaction product.

Yet another object of this invention is to provide a process for the film reaction of alpha-olefin and gaseous sulfur trioxide wherein it is essential that the film reaction be carried out in two consecutive reaction temperature zones.

These and other objects will be apparent after referring to the following specification and drawings, the details of which are hereinafter more fully described.

FIG. 4 is a flow chart outlining a preferred process used in the examples herein for producing detergent product from alpha-olefins and gaseous sulfur trioxide including as one processing operation the film sulfonation process of this invention.

FIG. 6 is a graph showing the temperature profile along the reaction zone for the reaction of Example I.

FIG. 7 is a graph showing the temperature profile along the reaction zone for the reaction of Example II.

Figure 1:
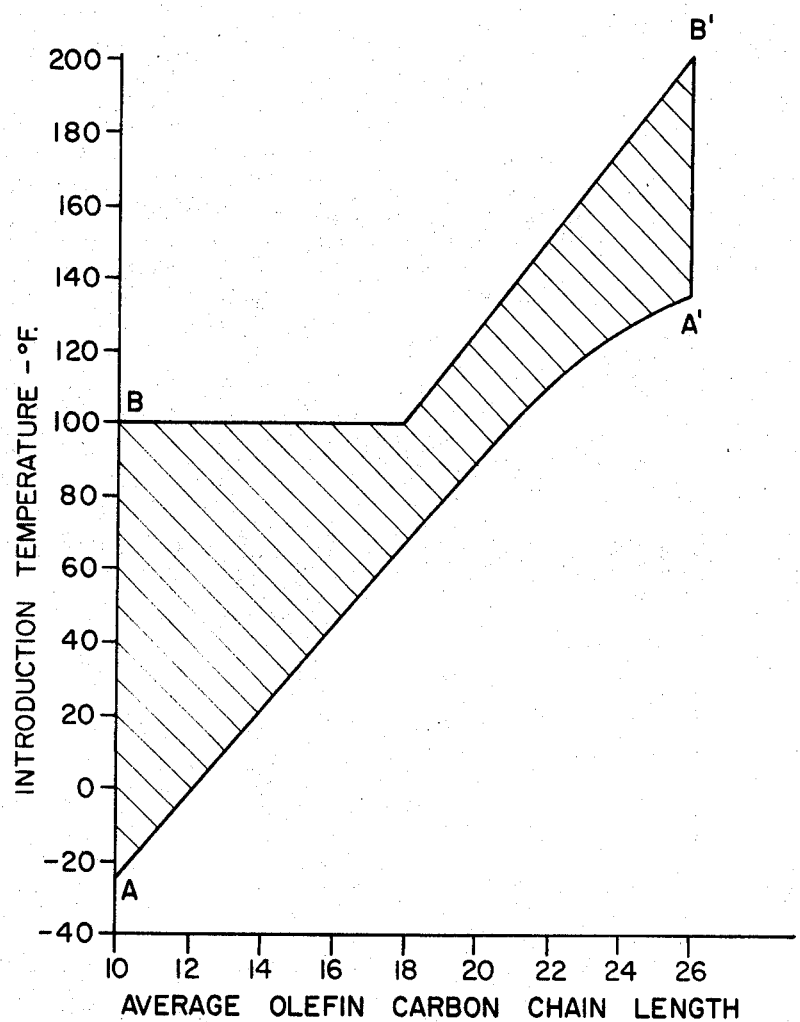
FIGS. 1–3 are graphs which define the temperature of reaction during the present film sulfonation process.

According to this invention, it has been found that the above objects are achieved by a process wherein gaseous sulfur trioxide is reacted with a thin flowing film of alpha-olefin under certain essential temperature conditions and other conditions as specified hereinafter.

In general, in this process, alpha-olefin and gaseous sulfur trioxide are introduced into a reaction zone defined by a supporting and confining heat exchange surface. The alpha-olefin is formed into a thin flowing film on the heat exchange surface in the reaction zone. This film is contacted with the gaseous sulfur trioxide to produce substantially complete reaction between the reactants to form a reaction mixture which can be converted into the above mentioned desirable detergent product. This reaction is highly exothermic. The exothermic heat of reaction is in part removed and the temperature controlled within hereinafter specified limits by heat transfer through the heat exchange surface.

Turning, first of all, to the reactants herein, the alpha-olefin reactant can contain from about 10 to about 26 carbon atoms, and preferably from 12 to 20 carbon atoms. Mixtures of these alpha-olefins can also be employed. These alpha-olefins can be derived from any convenient process, for example, wax cracking, ethylene buildup, and by dehydrating the primary alcohols obtained by hydrogenating fatty acids or their esters, e.g., those obtained from palm oil, tallow, coconut oil, and olive oil. Vinylidene branching which occasionally occurs as a by-product in some preparative methods offers no serious problems to the present invention. The present invention can tolerate amounts of vinylidene branched olefins in the starting material up to levels of about 10%, or even more. Although these by-products do not interfere with the sulfonation reaction, it is nevertheless a preferred embodiment of the present invention to run the sulfonation reaction with alpha-olefins wherein the vinylidene branched compounds are held to a minimum.

Alpha-olefins which can be used in the present invention include 1-decene, 1-undecene, 1-dodecene, 1-tridecene, 1-octadecene, 1-nonadecene, 1-eicosene, 1-heneicosene, 1-docosene, 1-tricosene, 1-tetracosene, 1-pentacosene, and 1-hexacosene. Mixture of these compounds can also be used.

The sulfur trioxide sulfonating agent used in the present invention is used as a gas reactant. It can be used alone in undiluted form or along with a diluent such as any of the commonly used inert gases, e.g., nitrogen, air, helium, argon, etc. When used in diluted form, the volumetric ratio of diluent to sulfur trioxide ordinarily should be in the range of from about 10:1 to about 100:1, and preferably within a range of from about 15:1 to about 75:1. When used in undiluted form or with a volumetric ratio of diluent to sulfur trioxide less than about 15:1, a subatmospheric pressure should be maintained in the reaction zone such that the partial pressure of sulfur trioxide ranges from about 1 mm. Hg to about 500 mm. Hg, preferably from about 6 mm. Hg to about 60 mm. Hg; otherwise the tendency of the acid mix to char during reaction may be increased. This subatmospheric pressure process is described in a copending application of Harold Henry Beyer and Charles Woolsey Motl, Ser. No. 514,468, filed Dec. 17, 1965. The pressures utilized during reaction are described further hereinafter.

The sulfur trioxide can be derived from any convenient source, for example, from the burning of sulfur, or from conventional oleum stripping. Stabilized sulfur trioxide can also be used, but the particular stabilizing agent such as tertiary butyl phosphate, boron and phosphorus compounds, represents a non-essential compound to the reaction system. If stabilized sulfur trioxide is used in the present process, the stabilizing agent should be removed from the sulfur trioxide before it is added to the reaction system.

Turning now to the processing conditions herein, the specific stock rate of alpha-olefin, that is, the rate in pounds per hour divided by the wetted perimeter of the reaction zone in inches, ranges from about 2 to about 15, preferably from about 4 to about 10, pounds per hour per inch.

The alpha-olefin is introduced into the reaction zone at a temperature defined by the shaded area on the graph of FIG. 1. The minimum temperature of introduction defined by line AA' on the graph is somewhat above the melting point of the olefin reactant. The maximum temperature of introduction is defined by line BB' on the graph. For olefins that are normally liquids, this maximum temperature is set at 100° F., the highest temperature ordinarily encountered during processing without the addition of heat. For olefins that are normally solids and require melting before processing, this maximum temperature is 20° to 60° F. above the melting point since introduction temperatures in excess of this level increase the tendency of the reaction product to char and discolor during reaction. A preferred introduction temperature for alpha-olefins having their chain lengths ranging from 10 to 18 carbon atoms is room temeprature, e.g., about 80° F., since the use of this temperature eliminates the need to cool or heat up the incoming reactant.

The alpha-olefin is introduced into the reaction zone in the form of a thin flowing film, the film thickness ranging from about 0.001 inch to about 0.1 inch and is preferably not more than about 0.05 inch. The bulk film flow can be either turbulent or non-turbulent. If the bulk film flow is non-turbulent, there often is still some turbulence at the interface between the flowing film and the gaseous reactant.

The mole ratio of sulfur trioxide to alpha-olefin introduced herein ordinarily ranges from about 1:1 to about 1.3:1. Mole ratios of less than about 1:1, for example, as low as about 0.85:1, are also advantageously used herein except that reaction completeness is lower than if at least stoichiometric amounts of sulfur trioxide are employed. The reaction completeness figures presented hereinafter presume that at least stoichiometric amounts of sulfur trioxide are employed.

The introduction temperature of the gaseous sulfur trioxide should be at least 50° F. since below this temperature the sulfur trioxide may condense to liquid form thereby possibly clogging the reactor. Ordinarily, the sulfur trioxide is introduced at a temperature within 20° F. either above or below that of the alpha-olefin introduction temperature, provided such sulfur trioxide introduction temperature exceeds the above-specified minimum of at least 50° F. For reaction with alpha-olefins containing 10 to 18 carbon atoms the gaseous sulfur trioxide is preferably introduced into the reaction zone at room temperature, e.g., about 80° F.

As previously stated, in the reaction zone the gaseous sulfur trioxide contacts the flowing film of alpha-olefin thereby causing the sulfonation reaction and producing reaction product, that is, acid mix. Ordinarily, contact is maintained over a length of reaction zone such that reaction is substantially complete, that is, greater than 85%. The reaction herein is essentially instantaneous, the residence time in the reaction zone being a function of alpha-olefin specific stock rate and reaction zone length. The reaction zone generally ranges in length from 3 feet to 30 feet with a length ranging from 5 feet to 24 feet preferred.

Turning now to the temperatures required to be maintained during reaction and which are essential for the production of reaction product which can be converted to an outstanding detergent product having commercially acceptable color, the film reaction must be carried out in two consecutive reaction temperature zones, a first temperature zone followed by a second temperature zone. This combination of temperature zones is sufficient to maintain the alpha-olefin reactant and reaction product in liquid condition and to provide substantially complete reaction, i.e., greater than 85% completeness, but at the same time to minimize or eliminate charring of the reaction product. Moreover, these temperature conditions are such as to produce the desired reaction product as described hereinafter.

The reaction temperatures described hereinafter are measured along the axis of the gas stream in the reaction zone. The temperatures measured in this way approximate and are very close to the temperatures at the interface between the flowing film and the gaseous reactant where reaction occurs. As previously mentioned, the reaction temperatures are controlled by heat exchange through the surface along which the film is flowing so there is a temperature gradient through the film.

The first reaction temperature zone is coextensive with the point the reactants are introduced into the reaction zone until the reaction is about 50 to about 90% complete. In this first temperature zone the liquid components of the system (alhpa-olefin and any reaction products formed) start out at a temperature at first equal to the olefin introduction temperature and rise to a peak temperature as exothermic reaction begins to take place. The temperature is then adjusted to or slightly below the second zone temperature. The temperature increment between the olefin feed temperature and the peak temperature is a function of average olefin carbon chain length and is defined by the shaded area on the graph of FIG. 2.

For temperature increments greater than those defined by this shaded area, there is an increased tendency for the reaction mixture to char. For temperature increments less than those defined by this shaded area, reaction completeness is low or the reaction zone must be increased to undesired lengths.

The second temperature zone is maintained until reaction is substantially complete, that is, greater than about 85% complete, usually 95% to 98% complete. In those cases where reaction is greater than about 85% complete in the first reaction zone, further reaction still takes place in this second reaction zone.

Figure 3:
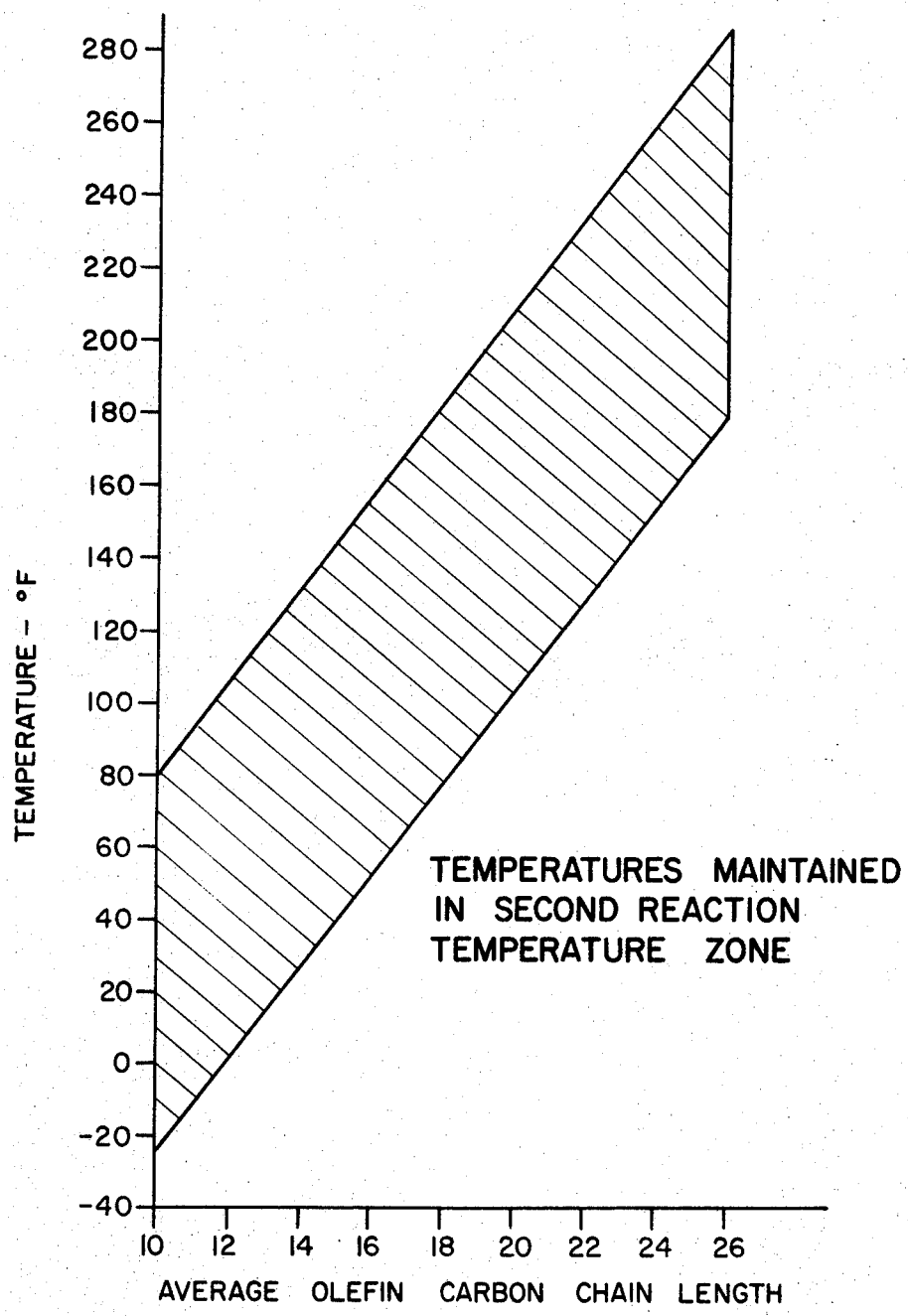

In this second temperature zone, while substantially constant temperature is preferred, the temperature is required to be within the temperature ranges defined by the shaded area on the graph of FIG. 3. This temperature in the second zone is a function of the average olefin chain length. If temperatures less than those defined by this shaded area are employed herein, the reaction mixture can solidify, or reaction completeness may be lower than otherwise. These low temperatures can also cause high reaction mixture viscosities which may result in high pressure drops leading to increased reaction time and darker product. On the other hand, the use of temperatures greater than those defined by this shaded area can also result in charred product. Such excessive temperatures also can cause low reaction mixture viscosity leading to undesirably short residence time and low completeness. In general, viscosity of the reaction mixture is maintained within the range of from about 2 cps. to about 200 cps.

The pressure maintained within the reaction zone during reaction can range from subatmospheric to a very high pressure such as 50 p.s.i.g. or more. The benefits of subatmospheric pressure have been previously described herein. Processes utilizing subatmospheric pressure require the use of a means for providing this pressure such as a steam ejector or vacum pump. Processes utilizing very high pressures require the use of special materials of construction. It is prefered to employ herein entering pressures ranging from about 3 to about 15 p.s.i.g. with a pressure drop through the reaction zone substantially equal the entering pressure.

The present process is carried out in any convenient film sulfonation apparatus adapted to provide the temperature and other conditions herein. The preferred reactor for use herein is the tubular reactor described hereinafter.

Turning now to the product produced by the present process, there is produced a sulfonated reaction mixture consisting essentially of from about 20% to about 50% positional isomers of alkene-1-sulfonic acids, from about 20% to about 50% sultone inner esters, and a minor amount of from about 2% to about 30% of highly polar polyfunctional disulfonated compounds, such as alkene disulfonic acids and sultone sulfonic acids. The sultone inner esters preferably contain at least five atoms in the cyclic group in order for the final composition to possess the desired detergency performance characteristics. The chain length of each of these compounds corresponds to the chain length of the starting alpha-olefins. This sulfonated reaction mixture is hyperalkalized and saponified as described in the copending patent application of Adriaan Kessler and Phillip F. Pflaumer Ser. No. 516,139, filed Dec. 23, 1965, now abandoned. The resulting detergent product can be readily formulated into unbuilt, lightly built, medium built and heavily built detergent compositions.

A preferred method for producing outstanding detergent product having commercially acceptable color, which method includes the present process, is outlined in FIG. 4 herein. This method is used in the examples herein.

With continuing reference to FIG. 4, stabilized, liquid sulfur trioxide is pumped from a storage tank (not shown) into a jacketed vessel 10 (shown as a box) wherein the sulfur trioxide is vaporized by circulating steam or hot water through the vessel jacket. The vaporized sulfur trioxide flows steadily out of the top of the vessel through line 12, the flow rate being controlled within ±1% limits. The stabilizer is accumulated at the bottom of vessel 10 and is disposed to waste.

The vaporized sulfur trioxide is diluted in line 12 with inert gas, e.g., dry nitrogen or air, entering line 12 from line 14 and the diluted $SO_3$ is passed to film reactor 24. The formed mixture of sulfur trioxide and inert gas contains by volume from 1.0% to 5.0% sulfur trioxide. After reaction as described hereinafter, the diluent gas is separated from the reaction product. The separated gas is introduced into line 16 and from there enters mist filter 18 where entrained reaction product is removed from the gas. The diluent gas is then recirculated to dilute freshly vaporized sulfur trioxide via line 20, pump 22 and line 14.

The diluted sulfur trioxide is then reacted with alpha-olefin in film reactor 24 which has reaction temperature zones 26 and 28. This film reactor is described hereinafter.

The reaction mix from the bottom of film 24, which consists essentially of acid mix (reaction product) and inert gas, flows into tank 30 wherein the inert gas rises exiting through line 16, and the acid mix is maintained in the bottom of the tank eventually exiting through line 32.

The acid mix having been separated from the inert gas is aged in the separating tank 30 to isomerize intermediates, thereby minimizing the amount of relatively insoluble 2-hydroxy sulfonate in the final product. The aging temperature is preferably the same as the temperature maintained in the second temperature zone of the film reactor. The aging time ranges from two to fifteen minutes. This aging process is described in the copending application of Kessler and Pflaumer, Ser. No. 561,352, filed June 29, 1966, now U.S. Pat. No. 3,488,384, sent to the Patent Office June 28, 1966.

The aged acid mix exiting from separating tank 30 via line 32 is pumped by pump 34 via line 36 into hyperalkalization dominant bath circuit comprising pump 38, line 40, heat exchanger 42, line 44, recycle line 46, and exit line 48. Diluted neutralizing agent, for example, aqueous sodium, potassium or ammonium hydroxide, is added into line 46 via line 47. The aged acid mix via line 36, diluted neutralizing agent via line 47, and a recycled fraction are vigorously mixed together in centrifugal pump 38, and a neutralization reaction occurs to form a neutralized paste. This neutralized paste passes through heat exchanger 42. The heat exchanger maintains a temperature ranging preferably from about 80 to about 200° F. in the dominant bath circuit. The temperature must be sufficient to maintain the reactants in liquid condition. The neutralized paste emerging from heat exchanger 42 is split into two fractions, a first fraction which is recirculated through the centrifugal pump 38 by way of recycle line 46, and a second fraction which is recovered as product via line 48. The recycle ratio of recirculated neutralized paste to product ranges from about 2:1 to about 15:1.

In the dominant bath circuit, the acid mix is preferably mixed with from 1.0 to 1.3 mole equivalents of neutralizing agent per mole of reacted sulfur trioxide. Some of this neutralizing agent participates in neutralization reaction in the dominant bath circuit. Sufficient neutralizing agent remains in the mixture to react in the subsequent saponification step. The addition of sufficient neutralizing agent not only to provide neutralization reaction in the dominant bath circuit but also to react in the subsequent saponification step is referred to herein as "hyperalkalization." Alternatively, sufficient neutralizing agent for neutralization reaction can be added in the dominant bath circuit with the subsequent addition of neutralizing agent necessary for saponification in that step.

The paste product is then pumped from line 48 by pump 50 into saponification tank 58 via line 52, heat exchanger 54, and line 56. In tank 58 the paste is saponified by maintaining a temperature ranging from about 220° F. to about 400° F. for a period of about 2 minutes to about 3 hours. The lower reaction temperatures are ordinarily employed with the longer reaction times while the higher reaction temperatures are ordinarily employed with the shorter reaction times. Preferably, the paste is maintained at 300–310° F. for from five to about ten minutes. The raised temperature is imparted to the paste in heat exchanger 54. In this saponification step, the sultone inner esters which are present are converted into sulfonates. When the saponification reaction has occurred, the saponified paste is pumped from tank 58 via line 60 through heat exchanger 62 whereby the temperature of the paste is lowered to that used in the succeeding bleaching operation. The resulting paste comprises detergent active and water.

The saponified paste flows via line 64 into bleaching tank 66 which is equipped with an agitator. The pH of the paste is adjusted to 7.5–8.5 by addition of 98% sulfuric acid. The paste is then treated by mixing with about 0.1% to about 0.5%, by weight of the detergent active in the paste, of hydrogen peroxide. Preferably, 0.15 to about 0.25% hydrogen peroxide, by weight of the detergent active in the paste, is employed since this amount of hydrogen peroxide ordinarily provides sufficient bleaching and at the same time assures a low enough amount of residual peroxide to eliminate any need for a sulfite treatment to neutralize excess peroxide. If there is a need for such treatment, sodium sulfite is ordinarily employed. The hydrogen peroxide is ordinarily employed in diluted form, for example, as 30% aqueous hydrogen peroxide. The paste is treated with the peroxide for a time period ranging from about 30 minutes to about 24 hours at a temperature ranging from room temperature to 140° F. The lower bleaching temperatures are ordinarily employed for the longer reaction times whereas the higher temperatures are employed for the shorter reaction times.

The product, a paste preferably containing from about 25% to about 45% by weight detergent active, is then pumped from the bottom of the bleaching tank via line 68 by pump 70 into line 72 which leads to storage facilities. The product is optionally cooled to storage temperature by heat exchanger 74.

Figure 5:
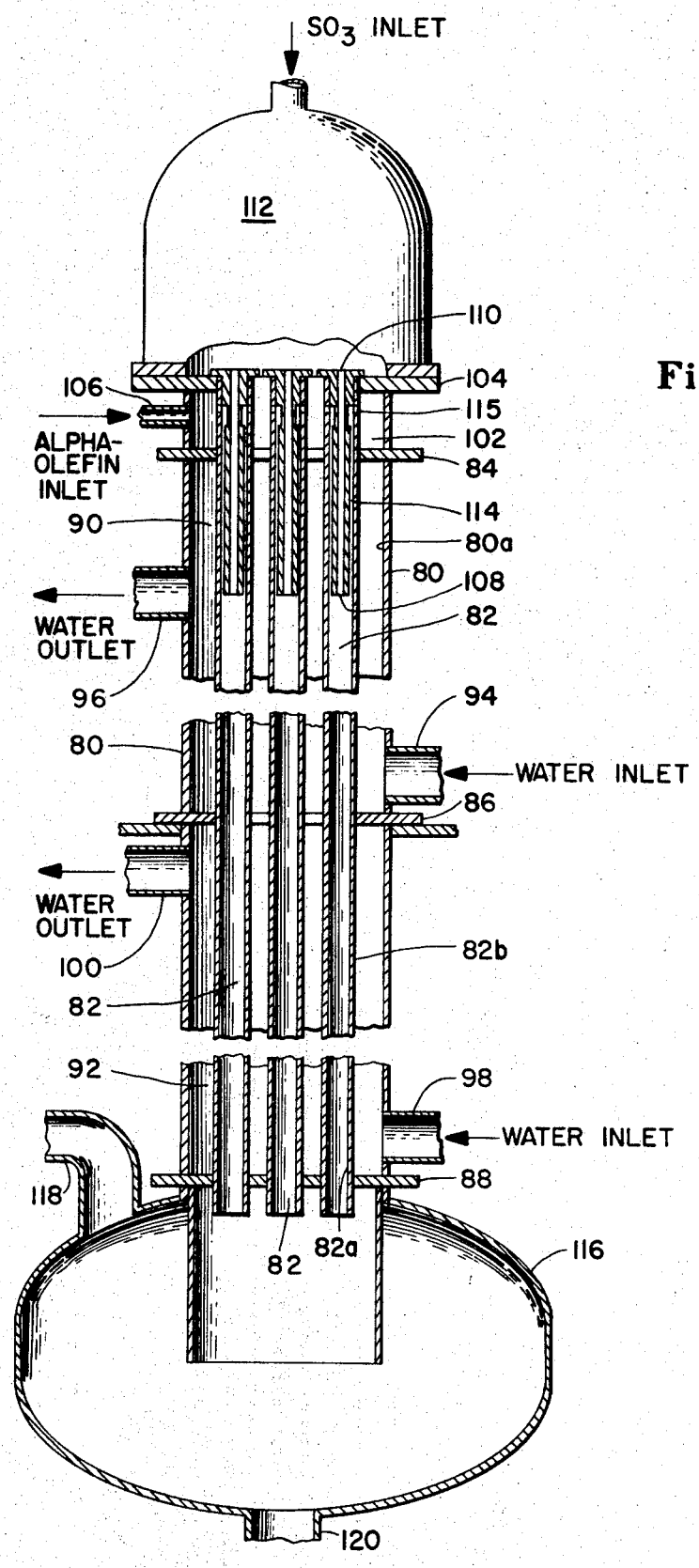
FIG. 5 is an elevational view, partly in section, of a film reactor which can be used to carry out the present process and is used in the examples herein.

The film reactor used in the above method is depicted in FIG. 5. With continuing reference to this figure, the reactor is a tube and shell or tubular reactor. It comprises a generally upright cylindrical housing or shell 80 having an inner surface 80a. The housing 80 surrounds one or a plurality of tubular reaction chambers 82 (three are shown) having side walls with inner surfaces 82a and outer surfaces 82b and which communicate at the top and bottom with other elements of this apparatus to be described hereinafter. The reaction chambers 82 generally range in length from 3 feet to 30 feet with a length ranging from 5 feet to 24 feet preferred. The diameter of each ordinarily ranges from 0.5 inch to 3 inches. The housing 80 and the reaction chambers 82 as well as all other elements of this apparatus described hereinafter which may contact the corrosive acids formed herein are constructed of stainless steel or glass or other substantially rigid acid-resistant construction materials.

The side walls of reaction chambers 82 are employed herein as heat exchange surfaces. These side walls together with inner surface 80a of housing 80 and partition members 84, 86 and 88 define two coolant circulation chambers 90 and 92. Coolant circulation chamber 90 is provided with inlet line 94 and outlet line 96. Coolant circulation chamber 92 is provided with inlet line 98 and outlet line 100. Coolant, e.g., water, is circulated through chambers 90 and 92 via the inlet lines 94 and 98 and outlet lines 96 and 100 to effect heat exchange through the side walls of reaction chambers 82 and to provide two essential reaction temperature zones within each reaction chamber.

A cylindrical alpha-olefin supply chamber 102 having a top wall 104 and as a bottom wall partition 84 and containing alpha-olefin inlet line 106 is above and in communication with reaction chambers 82. In concentric and film-forming relation with the side walls of reaction chambers 82 are feed inserts 108. An especially preferred feed insert suitable for use herein is described in the copending application of Ronald L. Jacobsen, William Robert Kristoff, Tom H. Ohren, and Dale Spatz, Ser. No. 565,189, now U.S. Pat. No. 3,482,947, filed concurrently herewith. The central portions of inserts 108 are gas inlet passageways 110 through which diluted gaseous sulfur trioxide is supplied into the reaction chambers 82. These gas inlet passageways are in communication with bell-shaped gas reservoir 112 which communicates with a source of sulfur trioxide gas (not shown) such as a sulfur trioxide vaporizer.

The lower portions of the outer surfaces of feed inserts 108 and the upper portions of the inner surfaces 82a of the side walls of reaction chambers 82 are juxtaposed thereby forming annular passageways 114 through which alpha-olefin passes from reservoir 102 via slots 115 and whereby thin films of alpha-olefin flowing along surfaces 82a are produced.

Separator and aging section 116 is below and in communication with the reaction chambers 82. Section 116 contains gas outlet line 118 which communicates with its upper portion and liquid outlet line 120 which communicates with its bottom.

With the apparatus depicted in FIG. 5, diluted gaseous sulfur trioxide and alpha-olefin are reacted in reaction chambers 82 starting at the initial point of contact between these ingredients and extending in a downward direction along the side walls of reaction chambers 82. The gaseous sulfur trioxide is continuously introduced into the reaction chambers 82 via reservoir 112 and feed inserts 108. The alpha-olefin is introduced into reaction chambers 82 in the form of flowing film via inlet line 106, reservoir 102, slots 115, and passageways 114. In the reaction chambers, the gaseous sulfur trioxide is in contact with the flowing film of alpha-olefin through two reaction temperature zones. These zones are adjacent to coolant circulation chambers 90 and 92 whereby the reaction temperatures are controlled as described above. The reaction mixture emerging from the bottom of chambers 82 is separated from the gas present and aged in section 116. Reaction mixture is recovered from line 120 for further processing as described hereinafter.

The specific examples in the following table are merely illustrative of the present invention and are not to be construed in any way as limiting its scope. In these examples, the preferred method outlined in FIG. 4 and the apparatus depicted in FIG. 5 are employed. The employed apparatus contains 3 tubular reaction chambers, each 0.9 inch in inside diameter and providing a twenty-foot long reaction zone. The top six feet of each reaction zone is the first reaction temperature zone herein. The bottom 14 feet of each reaction zone is the second reaction temperature zone herein.

In these examples, the film thicknesses are estimated average values over the length of the reaction zone. The viscosity of the liquid film in the second reaction zone is an estimated average value. The bulk film flow is non-turbulent. A color reading of 80 or above denotes commercially acceptable color.

TABLE

| | Example I | Example II |
|---|---|---|
| Alpha-olefin reactant | $C_{12}$, 10% by wt.; $C_{14}$, 80% by wt.; $C_{16}$, 10% by wt. | $C_{16}$, 50% by wt.; $C_{18}$, 50% by wt. |
| Alpha-olefin average carbon chain length | 14 | 17. |
| Specific stock rate of alpha-olefin (lbs./hr./circumferential inch) | 6.9 | 6.9. |
| Sulfonating agent | Diluted $SO_3$ (by volume 97.7% air, 2.3% $SO_3$). | Diluted $SO_3$ (by volume 97.7% air, 2.3% $SO_3$). |
| Gas flow rate per tube (standard cubic feet/min.) | 35 | 35. |
| Molar ratio ($SO_3$/alpha-olefin) | 1.05 | 1.05. |
| Film thickness | 0.035 inch | 0.035 inch. |
| Alpha-olefin introduction temperature | 80° F | 80° F. |
| Gas introduction temperature | 80° F | 80° F. |
| Pressure at beginning of reaction zone | 7 p.s.i.g | 7 p.s.i.g. |
| Temperature profile | Figure 6 | Figure 7. |
| Cooling water temperature-top 6 feet of reactor | 80° F | 80° F. |
| Reaction completeness after first reaction temperature zone | 85% | 85%. |
| Cooling water temperature-bottom 14 feet of reactor | 100° F | 140° F. |
| Viscosity of liquid in second reaction zone | 75 cps | 75 cps. |
| Reaction completeness after second reaction temperature zone | 96% | 96%. |
| Aging temperature | 100° F | 140° F. |
| Aging time | 10 minutes | 10 minutes. |
| Neutralizing agent (1.15 mole equivalent per mole reacted $SO_3$) | $NH_4OH$ | NaOH. |
| Hyperalkalization temperature | 100° F | 130° F. |
| Saponification temperature | 320° F | 320° F. |
| Saponification time | 10 minutes | 10 minutes. |
| pH during bleaching | 8.0 | 8.0. |
| Bleaching agent | 36% $H_2O_2$ | 30% $H_2O_2$. |
| Amount of aqueous $H_2O_2$ | 0.65% by weight of aqueous $H_2O_2$ | 0.65% by weight of aqueous $H_2O_2$ |
| Color (Coleman transmission, 2½% active at 425 millimicrons) | 85 | 95. |

The final products from Examples I and II are pastes containing 35% detergent active ingredient. The product from Example I is advantageously employed in an unbuilt liquid dish-washing product having the following formula:

| | Percent |
|---|---|
| Active formed in Example I | 25 |
| Coconut (middle-cut) amine oxide | 5 |
| Sodium coconut (middle-cut) alkyl glyceryl ether sulfonate | 4 |
| Ethanol | 10 |
| Water | Balance |

The product from Example II is advantageously employed in the production of a built granular detergent suitable, for example, for washing clothing, said detergent containing:

| | Percent |
|---|---|
| Active formed in Example II | 17 |
| Sodium tripolyphosphate | 49 |
| Silicate solids | 6 |
| Sodium sulfate | Balance |

Figure 2:
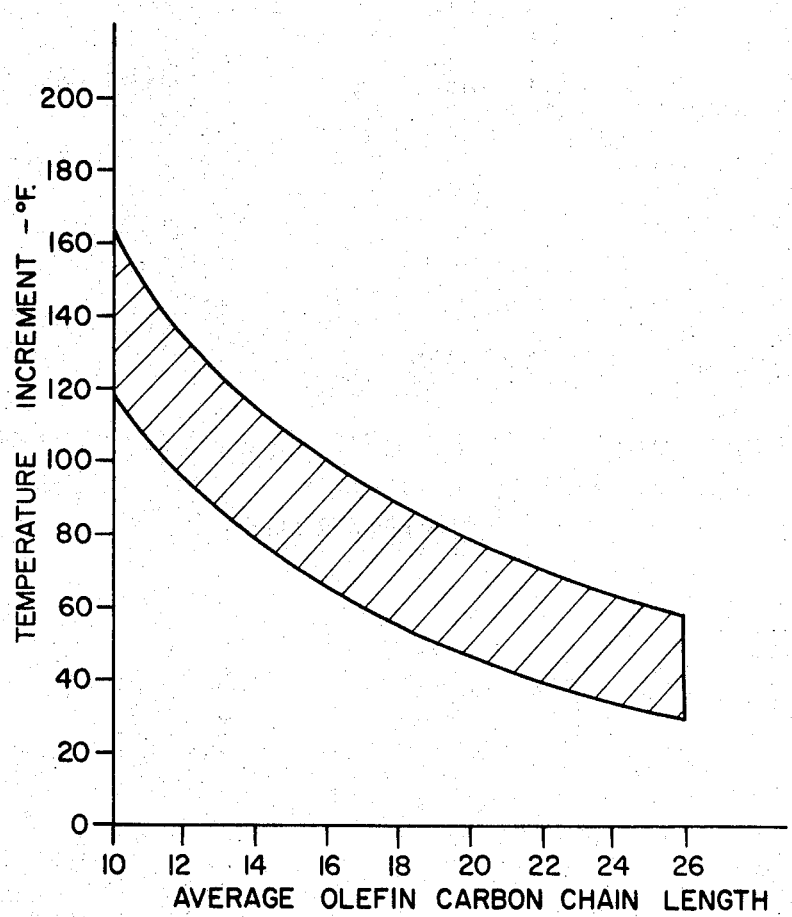

Excellent light-colored detergents are also obtainable in the above examples if other alpha-olefins are substituted for the alpha-olefins therein and the reaction conditions adjusted as described hereinbefore. For example, $C_{12}$-alpha-olefin or $C_{26}$-alpha-olefin can be substituted for the alpha-olefins of Examples I and II provided the temperature conditions described in FIGS. 1–3 are followed and the post-sulfonation reaction processing steps vary as described in the description herein of the preferred method outlined in FIG. 4.

The foregoing description has been presented describing certain operable and preferred embodiments of this invention. Other variations will be apparent to those skilled in the art.

What is claimed is:

1. A process for preparing a sulfonated reaction mixture consisting essentially of the steps of introducing an α-olefin having a carbon chain averaging 14 atoms in length and diluted gaseous sulfur trioxide, wherein the volumetric ratio of inert diluent gas to sulfur trioxide is 97.7:2.3, into a reaction zone 20 feet in length, the introduction temperatures of both α-olefin and diluted gaseous sulfur trioxide being 80° F.; forming a thin cylindrical-downward flowing liquid film of said α-olefin in said reaction zone; contacting said flowing liquid film with said gaseous sulfur trioxide to produce substantially complete reaction between said liquid film and said sulfur trioxide; removing at least a portion of the exothermic heat of reaction resulting from the contact of said liquid film with said sulfur trioxide by heat transfer so as to maintain a temperature profile during reaction as shown by line C on FIG. 6.

2. A process for preparing a sulfonated reaction mixture consisting essentially of the steps of introducing an α-olefin having a carbon chain averaging 17 atoms in length and diluted gaseous sulfur trioxide, wherein the volumetric ratio of inert diluent gas to sulfur trioxide is 97.7:2.3, into a reaction zone 20 feet in length, the introduction temperatures of both α-olefin and diluted gaseous sulfur trioxide being 80°F.; forming a thin cylindrical-downward flowing liquid film of said α-olefin in said reaction zone; contacting said flowing liquid film with said gaseous sulfur trioxide to produce substantially complete reaction between said liquid film and said sulfur trioxide; removing at least a portion of the exothermic heat of reaction resulting from the contact of said liquid film with said sulfur trioxide by heat transfer so as to maintain a temperature profile during reaction as shown by line D on FIG. 7.

References Cited
UNITED STATES PATENTS

| | | | |
|---|---|---|---|
| 2,923,728 | 2/1960 | Falk et al. | 260—513 |
| 3,259,645 | 7/1966 | Brooks et al. | 260—513 |
| 3,376,336 | 4/1968 | Stein et al. | 260—513 |
| 3,409,637 | 11/1968 | Eccles et al. | 260—504 |
| 3,328,460 | 6/1967 | Vander Mey. | |

DANIEL D. HORWITZ, Primary Examiner

PO-1050
(5/69)

UNITED STATES PATENT OFFICE
CERTIFICATE OF CORRECTION

Patent No. 3,531,518              Dated   September 29, 1970

Inventor(s) Tom H. Ohren and Ronald L. Jacobsen

It is certified that error appears in the above-identified patent and that said Letters Patent are hereby corrected as shown below:

Column 3, line 7, before "1-octadecene" insert --

1-tetradecene, 1-pentadecene, 1-hexadecene, 1-heptadecene --.

Signed and sealed this 6th day of April 1971.

(SEAL)
ATTEST:

EDWARD M. FLETCHER, JR.        WILLIAM E. SCHUYLER, JR.
Attesting Officer              Commissioner of Patents